(12) United States Patent
Izawa

(10) Patent No.: US 10,703,305 B2
(45) Date of Patent: Jul. 7, 2020

(54) WIRE HARNESS

(71) Applicant: SUMITOMO WIRING SYSTEMS, LTD., Yokkaichi-shi, Mie (JP)

(72) Inventor: Katsutoshi Izawa, Yokkaichi (JP)

(73) Assignee: SUMITOMO WIRING SYSTEMS, LTD., Mie (JP)

(*) Notice: Subject to any disclaimer, the term of this patent is extended or adjusted under 35 U.S.C. 154(b) by 0 days.

(21) Appl. No.: 16/479,037

(22) PCT Filed: Jan. 12, 2018

(86) PCT No.: PCT/JP2018/000590
§ 371 (c)(1),
(2) Date: Jul. 18, 2019

(87) PCT Pub. No.: WO2018/135391
PCT Pub. Date: Jul. 26, 2018

(65) Prior Publication Data
US 2019/0329724 A1    Oct. 31, 2019

(30) Foreign Application Priority Data
Jan. 20, 2017    (JP) .................................. 2017-008601

(51) Int. Cl.
*B60R 16/02*    (2006.01)
*H01B 7/18*    (2006.01)
(Continued)

(52) U.S. Cl.
CPC ........... *B60R 16/0215* (2013.01); *H01B 7/18* (2013.01); *H01R 4/18* (2013.01); *H01R 31/02* (2013.01); *H02G 3/04* (2013.01); *H01R 2201/26* (2013.01)

(58) Field of Classification Search
CPC . B60R 16/0215; B60R 16/02; B60R 16/0207; H01B 7/18; H01R 4/18;
(Continued)

(56) References Cited

U.S. PATENT DOCUMENTS 6,160,216 A * 12/2000 McMahon ........... H01B 7/0045
174/102 R
2004/0099427 A1    5/2004 Kihira
(Continued)

FOREIGN PATENT DOCUMENTS

JP    2004-171952 A    6/2004
JP    2006-310074 A    11/2006
(Continued)

OTHER PUBLICATIONS

Alpha-hp_technical_manual_pp. 1-90_Jan. 2013.*
Feb. 13, 2018 Search Report issued in International Patent Application No. PCT/JP2018/000590.

*Primary Examiner* — Timothy J Thompson
*Assistant Examiner* — Guillermo J Egoavil
(74) *Attorney, Agent, or Firm* — Oliff PLC

(57) ABSTRACT

A wire harness that includes a plurality of electrical wires; a relay connector provided with a common single tube having conductivity and through which the plurality of electrical wires are inserted; a plurality of braids respectively covering the plurality of electrical wires; and a coupler that couples the plurality of braids to the common single tube, in a state where ends of the plurality of braids are stacked in a layered manner around an entire circumference of the common single tube in a circumferential direction, wherein insertion holes that guide the plurality of electrical wires inside all of the braids are formed in the ends of the braids, and the plurality of electrical wires are electrically connected inside the relay connector.

6 Claims, 2 Drawing Sheets

(51) Int. Cl.
*H01R 31/02* (2006.01)
*H01R 4/18* (2006.01)
*H02G 3/04* (2006.01)

(58) Field of Classification Search
CPC ...... H01R 4/20; H01R 31/02; H01R 2201/26; H02G 3/04; H02G 3/0481; H02G 3/22; H02G 11/00; H05K 9/0098
USPC .............................................. 174/72 A, 350
See application file for complete search history.

(56) References Cited

U.S. PATENT DOCUMENTS

| | | | |
|---|---|---|---|
| 2006/0046569 A1* | 3/2006 | Kondou | H01R 9/034 439/497 |
| 2008/0135273 A1* | 6/2008 | Siems | H01R 13/58 174/36 |
| 2011/0299265 A1 | 12/2011 | Nakatsu et al. | |
| 2016/0134221 A1* | 5/2016 | Agata | H02P 21/22 318/490 |
| 2016/0149512 A1 | 5/2016 | Nakatsu et al. | |
| 2016/0295755 A1* | 10/2016 | Lee | H05K 9/0098 |
| 2016/0308456 A1 | 10/2016 | Nakatsu et al. | |
| 2017/0302191 A1 | 10/2017 | Nakatsu et al. | |
| 2018/0174709 A1* | 6/2018 | Hagi | H01B 7/0045 |

FOREIGN PATENT DOCUMENTS

| | | |
|---|---|---|
| JP | 2006-310474 A | 11/2006 |
| JP | 2012-060177 A | 3/2012 |
| JP | 2014-150725 A | 8/2014 |

* cited by examiner

WIRE HARNESS

This application is the U.S. National Phase of PCT/JP2018/000590 filed Jan. 12, 2018, which claims priority to JP 2017-008601 filed Jan. 20, 2017, the entire disclosure of which is incorporated herein by reference.

BACKGROUND

The present disclosure relates to a wire harness that is connected to a relay connector that relays power wiring of an electric car.

In electric cars, hybrid cars and the like, high voltage AC power is supplied from an inverter to various electrical devices via high voltage harnesses. The inverter converts DC voltage supplied from a battery into a desired high voltage, and supplies the resultant voltage to various electrical devices.

As shown in FIG. 3, supply of high voltage power from an inverter 1 to a heater 2 and an air conditioner 3, for example, may be mediated by a relay connector 4. With such a configuration, high voltage power is supplied from the inverter 1 to the relay connector 4 via a high voltage harness 7 consisting of a P-pole electrical wire 5a and an N-pole electrical wire 6a. High voltage power is then respectively supplied from the relay connector 4 to the heater 2 and the air conditioner 3 via high voltage harnesses 8 and 9.

The high voltage harness 8 is provided with a P-pole electrical wire 5b and an N-pole electrical wire 6b, and the high voltage harness 9 is provided with a P-pole electrical wire 5c and an N-pole electrical wire 6c.

As a result of such a configuration, the number of high voltage harnesses that are connected to the inverter 1 is reduced, and miniaturization of the inverter 1 is achieved.

As shown in FIG. 4, the three high voltage harnesses 7 to 9 are connected to the relay connector 4, the P-pole electrical wires 5a to 5c inside the high voltage harnesses 7 to 9 are electrically connected inside the relay connector 4, and the N-pole electrical wires 6a to 6c are electrically connected in a similar manner.

The high voltage harnesses 7 to 9 are each covered with a braided member 10 in order to shield noise. An end portion of each braided member 10 is fixed by crimping with a crimping implement 12 to an outer circumferential surface of a connecting tube portion 11 configured to introduce the high voltage harnesses 7 to 9 into the relay connector 4.

Note that JP 2004-171952A and JP 2014-150725A are known prior art documents relating to the above conventional technology.

SUMMARY

With the configuration shown in FIG. 4, in the case where the braided members 10 of the high voltage harnesses 7 to 9 are fixed by crimping to the relay connector 4, the workability of the crimping process deteriorates when the interval between the connecting tube portions 11 that attach the high voltage harnesses 7 to 9 is narrow. Also, there is a problem in that the relay connector 4 becomes larger when the interval between the connecting tube portions 11 is widened in order to improve the workability.

Note that as long as a structure is provided in which the connecting tube portions through which the electrical wires shielded by the braided members are inserted are closely disposed, the abovementioned problem will similarly occur even if a component other than the relay connector 4 is used.

An exemplary aspect of the disclosure provides a wire harness that can achieve device miniaturization while suppressing deterioration in the workability of connecting a braided member.

A wire harness according to an exemplary aspect of the disclosure includes a tube having conductivity and through which a plurality of electrical wires are inserted, a plurality of braids respectively covering the plurality of electrical wires, and a coupler that couples the plurality of braids to the tube, in a state where ends of the plurality of braids are stacked in a layered manner on an outer circumferential surface of the tube, wherein insertion holes that guide the plurality of electrical wires inside all of the braids are formed in the ends of the braids.

According to this configuration, electrical wires are guided inside braids through insertion holes, and ends of the braids are stacked on the outer circumferential surface of a tube in a layered manner and coupled with a coupler.

Also, in the above wire harness, preferably the ends of the plural braids are stacked in a layered manner around an entire circumference of the tube in a circumferential direction.

According to this configuration, the ends of the plural braids are stacked in a layered manner around the entire circumference of the tube in the circumferential direction.

Also, in the above wire harness, preferably the coupler is a crimping implement that collectively fixes the ends of the plural braids by crimping to the tube.

According to this configuration, the ends of the braids are collectively fixed by crimping to the tube.

Also, in the above wire harness, preferably the wire harness is configured to supply high voltage power supplied from an inverter to a plurality of devices via the plurality of electrical wires and a relay connector, and the tube is provided in the relay connector.

According to this configuration, the ends of the braids are coupled to the tube which is provided in a relay connector.

Also, in the above wire harness, preferably each electrical wire includes a P-pole electrical wire and an N-pole electrical wire.

According to this configuration, a P-pole electrical wire and an N-pole electrical wire of each electrical wire are guided inside the braids of all of the electrical wires.

A wire harness according to some modes of the present disclosure enables device miniaturization to be achieved, while suppressing deterioration in the workability of connecting a braid. Other aspects and advantages of the present disclosure will become apparent from the following description taken in conjunction with the accompanying drawings, which show by way of example the technical idea of the disclosure.

DETAILED DESCRIPTION OF EMBODIMENTS

Figure 1:
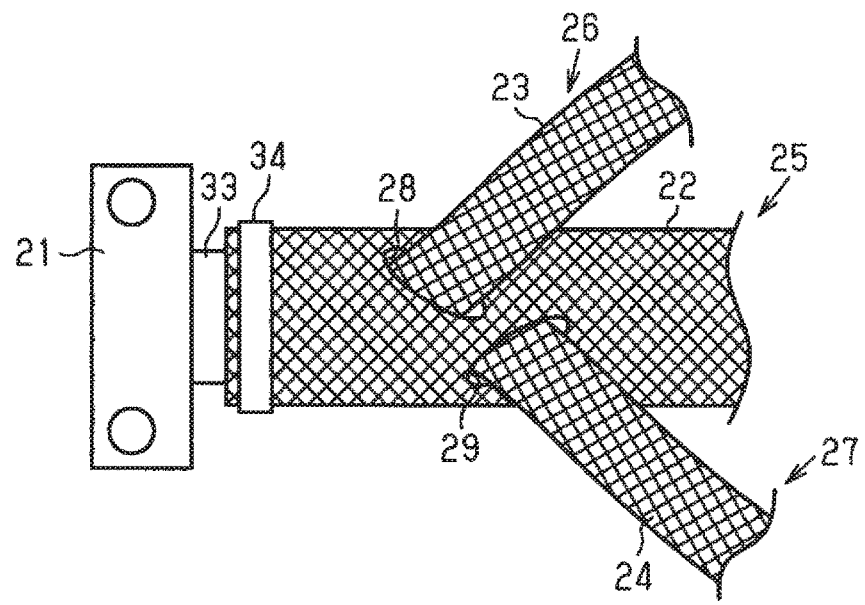
FIG. 1 is a front view showing a wire harness of one embodiment.

Hereinafter, one embodiment of a wire harness will be described in accordance with the drawings. The wire harness of this embodiment is used as a high voltage harness that connects an inverter 1 to devices such as a heater 2 and an air conditioner 3, for example, and supplies high voltage power thereto, via a relay connector, similarly to the conventional example shown in FIG. 3. Because the configurations of P-pole electrical wires 5a to 5c and N-pole electrical wires 6a to 6c constituting the high voltage harnesses, the inverter 1, the heater 2, the air conditioner 3 and the like are similar to the conventional example, description will be given using the same reference signs.

As shown in FIG. 1, three high voltage harnesses 25 to 27 respectively covered with braided members 22 to 24 are connected to a relay connector 21. The high voltage harness 25 is covered with the braided member 22, the high voltage harness 26 is covered with the braided member 23, and the high voltage harness 27 is covered with the braided member 24. The braided members 22 to 24 are tubularly formed.

Figure 2:
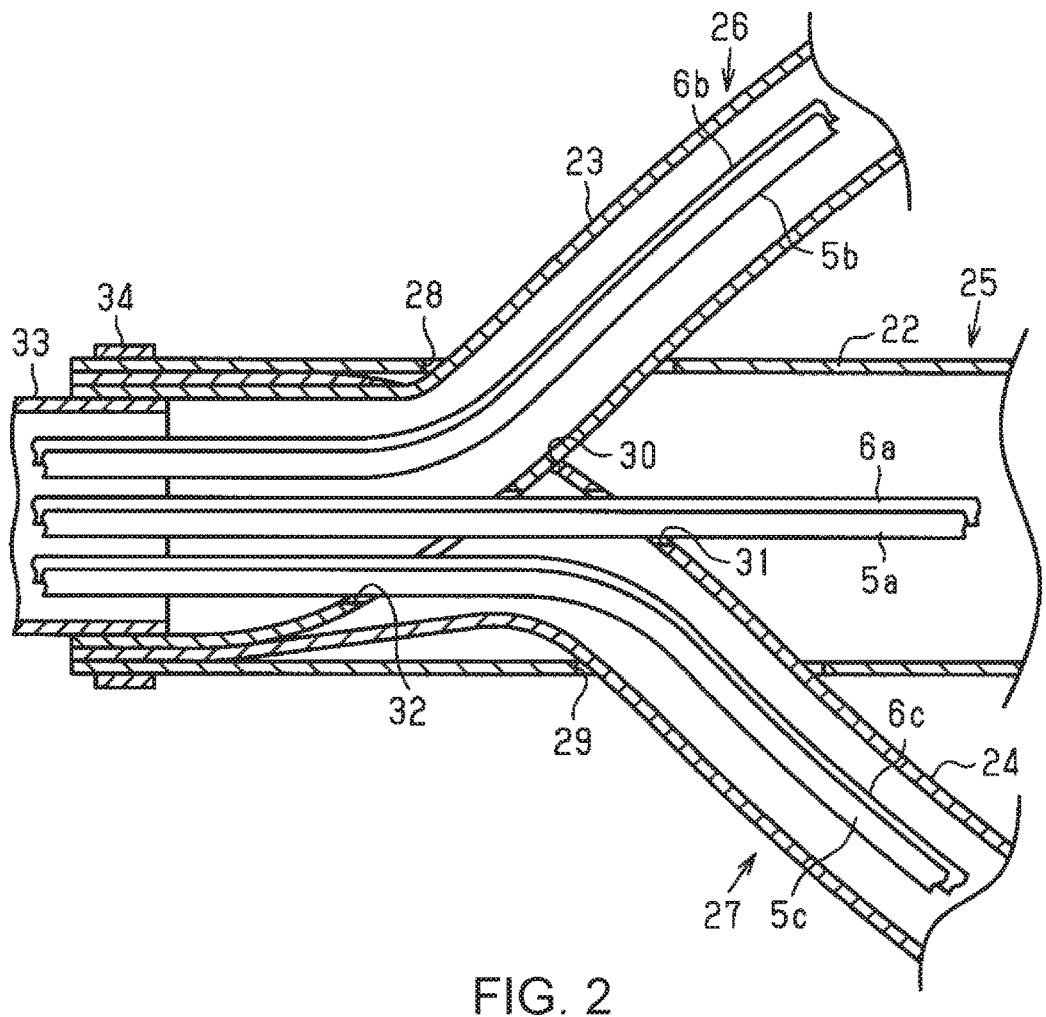
FIG. 2 is a cross-sectional view showing the wire harness of one embodiment.

FIG. 2 shows an internal configuration of the high voltage harnesses 25 to 27 that are connected to the relay connector 21.

The high voltage harness 25 is a harness that connects the relay connector 21 and the inverter 1, and has the P-pole electrical wire 5a and the N-pole electrical wire 6a. The P-pole electrical wire 5a and N-pole electrical wire 6a constituting the high voltage harness 25 are covered with the braided member 22.

The high voltage harness 26 is a harness that connects the relay connector 21 and the heater 2, and has the P-pole electrical wire 5b and the N-pole electrical wire 6b. The P-pole electrical wire 5b and N-pole electrical wire 6b constituting the high voltage harness 26 are covered with the braided member 23.

The high voltage harness 27 is a harness that connects the relay connector 21 and the air conditioner 3, and has the P-pole electrical wire 5c and the N-pole electrical wire 6c. The P-pole electrical wire 5c and N-pole electrical wire 6c constituting the high voltage harness 27 are covered with the braided member 24.

Insertion holes that guide the plurality of high voltage harnesses inside all of the braided members 22 to 24 are formed in end portions of the braided members 22 to 24. To be specific, two insertion holes 28 and 29 are formed in the end portion of the braided member 22 near the relay connector 21. Two insertion holes 30 and 31 are formed in the end portion of the braided member 24 near the relay connector 21. An insertion hole 32 is formed in the end portion of the braided member 23 near the relay connector 21.

The end portion of the braided member 24 passes through the insertion hole 29 of the braided member 22 and is inserted inside the braided member 22, and the end portion of the braided member 23 passes through the insertion hole 28 of the braided member 22 and the insertion hole 30 of the braided member 24, and is inserted inside the braided members 22 and 23. The end portions of the braided members 22 to 24 extend to a position covering a connecting tube portion 33 of the relay connector 21 in a layered manner. In this example, the end portions of the braided members 22 to 24 are stacked in a layered manner around the entire circumference of the connecting tube portion 33 in the circumferential direction. Also, the end portions of the braided members 22 to 24 are stacked in a layered manner on the outer circumferential surface of the connecting tube portion 33 in order of the braided member 23, the braided member 24 and the braided member 22. At these end portions of the braided members 22 to 24 stacked in a layered manner, all of the braided members 22 to 24 are disposed in a substantially concentric circular manner.

The P-pole electrical wire 5b and N-pole electrical wire 6b constituting the high voltage harness 26 are inserted into the braided member 23, and extend into the relay connector 21 through the connecting tube portion 33. In other words, the P-pole electrical wire 5b and the N-pole electrical wire 6b are guided inside all of the braided members 22 to 24, through the insertion hole 28 of the braided member 22 and the insertion hole 30 of the braided member 24 from outside the braided member 22.

The P-pole electrical wire 5c and N-pole electrical wire 6c constituting the high voltage harness 27 are inserted into the braided member 23 through the insertion hole 32 of the braided member 23 from inside the braided member 24, and extend inside the relay connector 21 through the inside of the connecting tube portion 33. In other words, the P-pole electrical wire 5c and the N-pole electrical wire 6c are guided inside all of the braided members 22 to 24, through the insertion hole 29 of the braided member 22 and the insertion hole 32 of the braided member 23 from outside the braided member 22.

The P-pole electrical wire 5a and N-pole electrical wire 6a constituting the high voltage harness 25 are inserted into the braided member 23 through the insertion hole 31 of the braided member 24 and the insertion hole 32 of the braided member 23 from inside the braided member 22, and extend inside the relay connector 21 through the inside of the connecting tube portion 33. In other words, the P-pole electrical wire 5a and the N-pole electrical wire 6a are guided inside all of the braided members 22 to 24, through the insertion hole 31 of the braided member 24 and the insertion hole 32 of the braided member 23 from inside the braided member 22.

The P-pole electrical wires 5a to 5c are electrically connected inside the relay connector 21, and the N-pole electrical wires 6a to 6c are also electrically connected inside the relay connector 21.

The end portions of the braided members 22 to 24 are fixed by crimping to the connecting tube portion 33 by a crimping implement 34, in a state of being stacked in a layered manner on the outer circumferential surface of the connecting tube portion 33 having conductivity. As a result, the braided members 22 to 24 are coupled to the connecting tube portion 33, and the braided members 22 to 24 are also electrically connected to the connecting tube portion 33.

Next, the operation of the wire harness constituted as described above will be described.

Because the high voltage harnesses 25 to 27 are respectively covered with the braided members 22 to 24, noise shielding of the P-pole electrical wires 5a to 5c and the N-pole electrical wires 6a to 6c inside the high voltage harnesses 25 to 27 is secured.

The P-pole electrical wires 5a to 5c and the N-pole electrical wires 6a to 6c inside the high voltage harnesses 25 to 27 are guided inside the relay connector 21 through the common connecting tube portion 33. The braided members 22 to 24 covering the high voltage harnesses 25 to 27 can then be collectively fixed by crimping to the connecting tube portion 33 with the crimping implement 34.

The effects shown below can be obtained with a wire harness such as the above.

(1) The braided members 22 to 24 covering the three high voltage harnesses 25 to 27 can be collectively fixed by crimping to the common connecting tube portion 33 of the relay connector 21. Accordingly, the process of fixing the braided members 22 to 24 of the high voltage harnesses 25 to 27 by crimping to the relay connector 21 can be easily performed.

(2) Because the braided members 22 to 24 of the high voltage harnesses 25 to 27 can be collectively fixed by crimping to the common connecting tube portion 33 of the relay connector 21, miniaturization of the casing of the relay connector 21 can be achieved.

Note that the above embodiment may be changed as follows.

Four or more high voltage harnesses connected to a relay connector may be provided.

The above embodiment describes a relay connector that relays supply of high voltage power to the air conditioner 3 and the heater 2 from the inverter 1. The present disclosure is not limited thereto, and a relay connector that relays supply of power to a plurality of devices from a device other than the inverter 1 may be provided.

In the above embodiment, the coupling member that couples the braided members 22 to 24 to the connecting tube portion 33 is embodied as the crimping implement 34, but the present disclosure is not limited thereto. For example, the coupling member may be embodied as a tape, a resin band, or the like.

Figure 3:
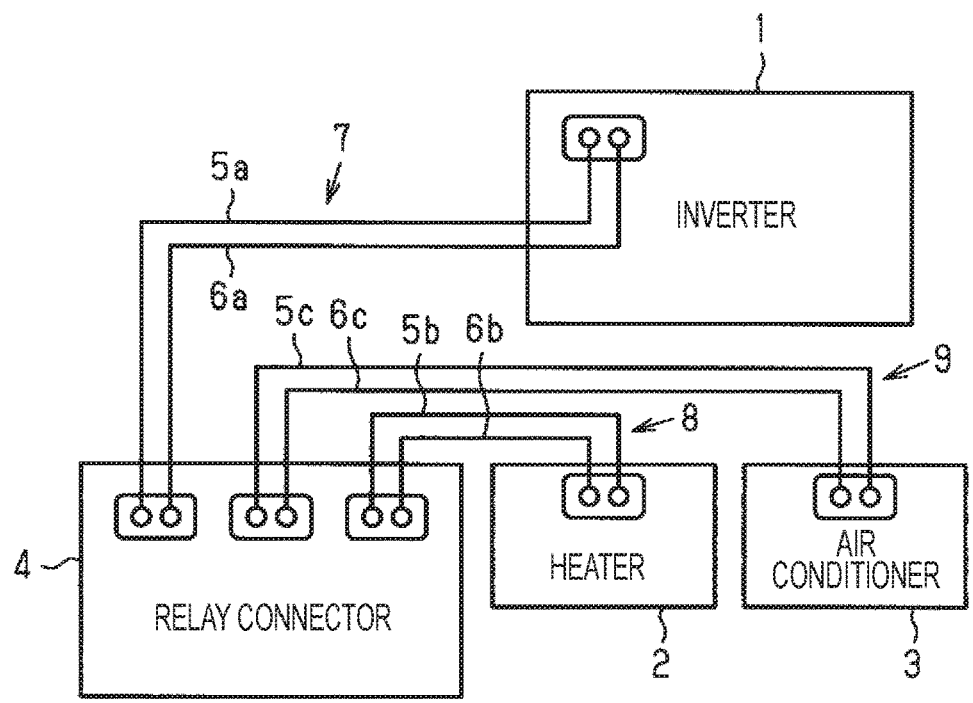
FIG. 3 is a schematic diagram showing a wire harness connected to a relay connector.
Figure 4:
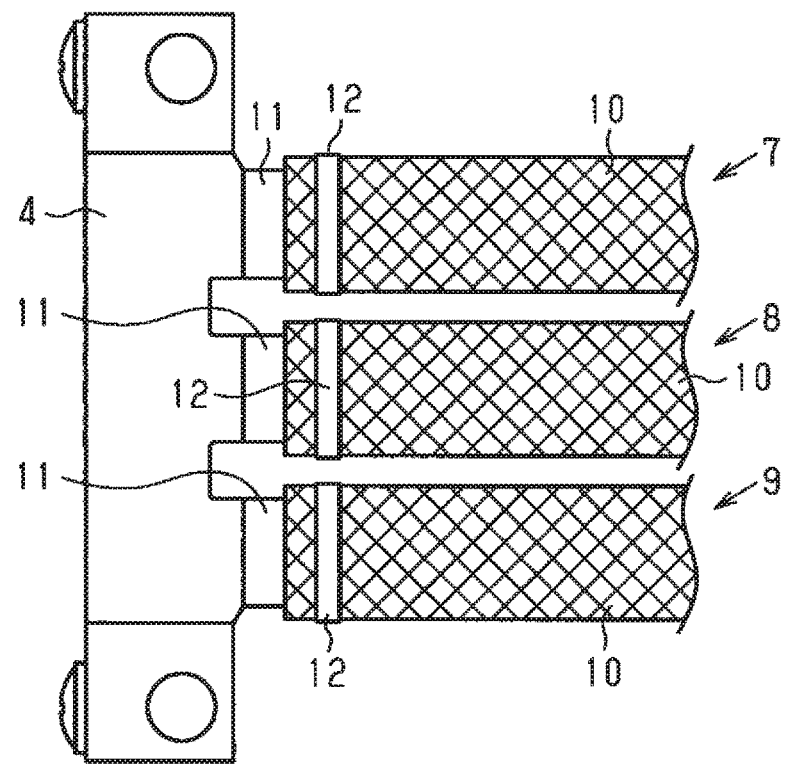
FIG. 4 is a front view showing an exemplary connection of a conventional wire harness and relay connector.

As shown in FIGS. 1 to 3, the wire harness is provided with a single base end portion that is the connecting tube portion 33 of the relay connector 21 or is connected to the connecting tube portion 33 of the relay connector 21, and a plurality of tip end portions that are respectively connected to the inverter 1 and the plurality of load devices 2 and 3. In FIG. 2, the base end portions of the braided members 22 to 24 stacked in a radial direction are examples of the multilayer open end portion, and are provided on the base end portion of the wire harness. The insertion holes 28, 29, 39, 31 and 32 may be referred to as branch holes for branching the plurality of braided members 22, 23 and 24 (and the plurality of electrical wire pairs) toward the plurality of tip end portions from the single connecting tube portion 33.

The braided member 22 that contacts the coupling member 34 is an example of the outermost braided member. The braided member 23 that contacts the connecting tube portion 33 is an example of the innermost braided member. The braided member 24 between the braided member 22 and the innermost braided member 23 in the radial direction is an example of the one or more interlayer braided members.

The P-pole electrical wires 5a to 5c and the N-pole electrical wires 6a to 6c are an example of the plurality of electrical wire pairs. The electrical wire pairs 5a and 6a are associated with the outermost braided member 22, and may be referred to as a first electrical wire pair. The electrical wire pairs 5b and 6b are associated with the innermost braided member 23, and may be referred to as a second electrical wire pair. The electrical wire pairs 5c and 6c are associated with the interlayer braided member 24, and may be referred to as a third electrical wire pair.

The insertion holes 28 and 29 of the outermost braided member 22 are formed in the outer circumferential wall of the outermost braided member 22 at positions separated from the open end portion of the outermost braided member 22 in the longitudinal direction of the outermost braided member 22. The insertion hole 28 of the outermost braided member 22 that the innermost braided member 23 passes through may be referred to as a first insertion hole of the outermost braided member 22. The insertion hole 29 of the outermost braided member 22 that the interlayer braided member 24 passes through may be referred to as a second insertion hole of the outermost braided member 22. The insertion hole 30 of the interlayer braided member 24 that the innermost braided member 23 passes through may be referred to as a first insertion hole of the interlayer braided member 24. The insertion hole 31 of the interlayer braided member 24 that the first electrical wire pair 5a and 6a passes through may be referred to as a second insertion hole of the interlayer braided member 24. The insertion hole 32 of the innermost braided member 23 that the first electrical wire pair 5a and 6a and the third electrical wire pair 5c and 6c pass through may be referred to as a single insertion hole of the innermost braided member 23.

The first electrical wire pair 5a and 6a passes through the inside space of the innermost braided member 23 from the connecting tube portion 33, and extends to the inside space of the outermost braided member 22 after passing through the insertion hole 32 of the innermost braided member 23 and the second insertion hole 31 of the interlayer braided member 24.

The second electrical wire pair 5b and 6b (and the innermost braided member 23) extends outside the outermost braided member 22 after passing through the first insertion hole 30 of the interlayer braided member 24 and the first insertion hole 28 of the outermost braided member 22 from the connecting tube portion 33.

The third electrical wire pair 5c and 6c extends outside the outermost braided member 22 after passing through the insertion hole 32 of the innermost braided member 23 and the second insertion hole 29 of the outermost braided member 22 from the connecting tube portion 33.

The present disclosure embraces the following implementation examples. The reference signs of the constituent elements of the embodiment are given to assist understanding rather than for limitation.

Supplementary Note 1

In some examples, a wire harness is provided with a conductive tubular member (33) having an open end portion and an outer circumferential surface, a plurality of electrical wire pairs (5a, 6a; 5b, 6b; 5c, 6c) including a first electrical wire pair (5a, 6a) and a second electrical wire pair (5b, 6b) that are drawn out from the conductive tubular member (33) through the open end portion of the conductive tubular member (33), and a coupling member (34) that fixedly couples a multilayer open end portion of a plurality of tubular braided members (22, 23, 24) to the outer circumferential surface of the conductive tubular member (33), in a state where the multilayer open end portion contacts the outer circumferential surface of the conductive tubular member (33), the plurality of tubular braided members (22, 23, 24) each having an open end portion, an outer circumferential wall and an inside space, and the multilayer open end portion being formed by the open end portions of the plurality of tubular braided members (22, 23, 24) being stacked in a radial direction, wherein each of the plurality of tubular braided members (22, 23, 24) have at least one insertion hole (28, 29, 30, 31, 32) formed in the outer circumferential wall of the tubular braided member in a position separated from the open end portion of the tubular braided member in a longitudinal direction of the braided member, the plurality of tubular braided members (22, 23, 24) include an outermost braided member (22) contacting the coupling member (34) and an innermost braided member (23) contacting the outer circumferential surface of the conductive tubular member (33), and the innermost braided member (23) covering the second electrical wire pair (5b, 6b) passes through a first insertion hole (28) of the outer circumferential wall of the outermost braided member (22)

from the conductive tubular member (33), and extends outside the outermost braided member (22).

Supplementary Note 2

In some preferred examples, the first electrical wire pair (5a, 6a) passes through the insertion hole (32) of the innermost braided member (23) from the conductive tubular member (33), and extends to the inside space of the outermost braided member (22).

Supplementary Note 3

In some preferred examples, the plurality of tubular braided members (22, 23, 24) include an interlayer braided member (24) disposed between the outermost braided member (22) and the innermost braided member (23), and the interlayer braided member (24) passes through the second insertion hole (29) of the outer circumferential wall of the outermost braided member (22) from the conductive tubular member (33), and extends outside the outermost braided member (22).

Supplementary Note 4

In some examples, the third electrical wire pair (5c, 6c) passes through the insertion hole (32) of the innermost braided member (23) and the second insertion hole (29) of the outer circumferential wall of the outermost braided member (22) from the conductive tubular member (33).

Supplementary Note 5

In some desirable examples, the second electrical wire pair (5b, 6b) passes through the first insertion hole (30) of the outer circumferential wall of the interlayer braided member (24) and the first insertion hole (28) of the outer circumferential wall of the outermost braided member (22) from the conductive tubular member (33), and extends outside the outermost braided member (22).

Supplementary Note 6

In some desirable examples, the insertion hole (32) of the innermost braided member (23) and the first insertion hole (30) and the second insertion hole (31) of the interlayer braided member (24) are disposed in the inside space of the outermost braided member (22).

Supplementary Note 7

In some desirable examples, the conductive tubular member (33) is a single tubular member connected to the multilayer open end portion of the plurality of tubular braided members (22, 23, 24).

It will be apparent to a person skilled in the art that the present disclosure may be embodied in other specific forms without departing from the technical idea thereof. For example, some of the components described in the embodiment (or one or more modes) may be omitted or a number of components may be combined.

The invention claimed is:

1. A wire harness comprising:
a plurality of electrical wires;
a relay connector provided with a common single tube having conductivity and through which the plurality of electrical wires are inserted;
a plurality of braids respectively covering the plurality of electrical wires; and
a coupler that couples the plurality of braids to the common single tube, in a state where ends of the plurality of braids are stacked in a layered manner around an entire circumference of the common single tube in a circumferential direction,
wherein insertion holes that guide the plurality of electrical wires inside all of the braids are formed in the ends of the braids, and the plurality of electrical wires are electrically connected inside the relay connector, and
wherein the end of a first braid of the plurality of braids is inserted inside the end of a second braid of the plurality of braids so that an end of the relay connector is within the ends of both the first braid and the second braid.

2. The wire harness according to claim 1,
wherein at least one of the insertion holes is formed in an outer circumferential wall of each braid.

3. The wire harness according to claim 1,
wherein the coupler is a crimping implement that collectively fixes the ends of the plurality of braids by crimping to the common single tube.

4. The wire harness according to claim 1,
wherein the wire harness is configured to supply voltage power supplied from an inverter to a plurality of devices via the plurality of electrical wires and the relay connector.

5. The wire harness according to claim 4,
wherein each electrical wire of the plurality of electrical wires includes a P-pole electrical wire and an N-pole electrical wire.

6. A wire harness comprising:
a plurality of electrical wires;
a plurality of braided members respectively covering the plurality of electrical wires;
a tubular member that has conductivity and allows the plurality of electrical wires to be inserted in common; and
a coupling member that couples the plurality of braided members and the tubular member,
wherein a remaining braided member, excluding one braided member from among the plurality of braided members, is a first braided member,
the one braided member is a second braided member,
the second braided member has an insertion hole that guides the first braided member to the inside of the second braided member,
the first braided member extends inside the second braided member from the insertion hole toward one end portion of the second braided member,
the tubular member is inserted inside the plurality of braided members such that an outer peripheral surface of the end portion of the tubular member and an inner peripheral surface of one end portion of the first braided member are in contact with each other,
in a state in which the second braided member, the first braided member, and the tubular member are stacked in a layered manner at one end portion side of the second braided member, the coupling member couples the braided member and the tubular member,
each of the plurality of electrical wires is covered with a respective one of the plurality of braided members at a position farther, than the insertion hole, from one end portion of the second braided member, and the plurality of electrical wires are collectively covered with the second braided member and the first braided member at a position closer, than the insertion hole, to one end portion of the second braided member.

* * * * *